US012567815B2

(12) United States Patent
Sala Caselles

(10) Patent No.: US 12,567,815 B2
(45) Date of Patent: Mar. 3, 2026

(54) DIRECT CURRENT TO ASYMMETRICAL SQUARE WAVE ALTERNATING CURRENT CONVERTER

(71) Applicant: POWER INNOTECH S.L., Barcelona (ES)

(72) Inventor: Vicent Sala Caselles, Barcelona (ES)

(73) Assignee: POWER INNOTECH S.L., Barcelona (ES)

( * ) Notice: Subject to any disclaimer, the term of this patent is extended or adjusted under 35 U.S.C. 154(b) by 201 days.

(21) Appl. No.: 18/289,271

(22) PCT Filed: May 3, 2022

(86) PCT No.: PCT/ES2022/070266
§ 371 (c)(1),
(2) Date: Nov. 2, 2023

(87) PCT Pub. No.: WO2022/234169
PCT Pub. Date: Nov. 10, 2022

(65) Prior Publication Data
US 2024/0258933 A1      Aug. 1, 2024

(30) Foreign Application Priority Data
May 3, 2021    (ES) ................................ ES202130389

(51) Int. Cl.
*H02M 7/5387*      (2007.01)
(52) U.S. Cl.
CPC .................................. *H02M 7/5387* (2013.01)
(58) Field of Classification Search
CPC ...... H02M 7/53; H02M 7/537; H02M 7/5387; H02M 7/53871
See application file for complete search history.

(56) References Cited

U.S. PATENT DOCUMENTS

2011/0019453 A1* 1/2011 Gonzalez Senosiain ...................
                                              H02M 7/48
                                              363/131
2016/0005181 A1   1/2016 Cordara et al.
2018/0029851 A1   2/2018 Polumati et al.

FOREIGN PATENT DOCUMENTS

CN      202617005 U   12/2012
CN      203278773 U   11/2013
CN      204439681 U    7/2015
CN      208154454 U   11/2018
(Continued)

OTHER PUBLICATIONS

Int'l Search Report for PCT/ES2022/070266, dated Jul. 15, 2022.
(Continued)

*Primary Examiner* — Adolf D Berhane
(74) *Attorney, Agent, or Firm* — Edell, Shapiro & Finnan, LLC

(57) ABSTRACT

A direct current to asymmetrical square wave alternating current converter is provided that includes two direct current supplies A and B, that provide, respectively, VA and VB output voltages; and four commuting devices (Q1, Q2, Q3 and Q4); in that the power supplies and the commuters form a bridge structure of, at least two Half-bridge substructures, each of which includes two commuting devices and, at least, a direct current power supply. The Half-bridge substructures are connected to each other in the intermediate and low branches, where the work charge RL is connected in the intermediate branch.

14 Claims, 6 Drawing Sheets

(56)         References Cited

FOREIGN PATENT DOCUMENTS

| CN | 109889050 | | 6/2019 | | |
|----|-----------|---|--------|---|---|
| GB | 2121622 | A * | 12/1983 | .............. | H05G 1/10 |
| WO | WO-2022258825 | A1 * | 12/2022 | .......... | H02M 1/0058 |

OTHER PUBLICATIONS

Yueh-Ru Yang, et al., "A DC-Pulse Power Supply Designed for Plasma Applications", PEDS2009, 2009 International Conference on Power Electronics and Drive Systems (PEDS), Nov. 2-5, 2009, 5 pages.

* cited by examiner

FIG. 1-A
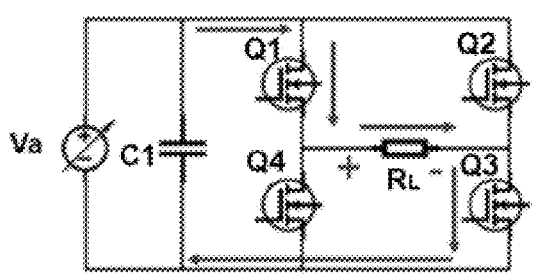 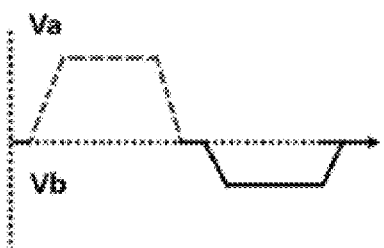
FIG. 1-B
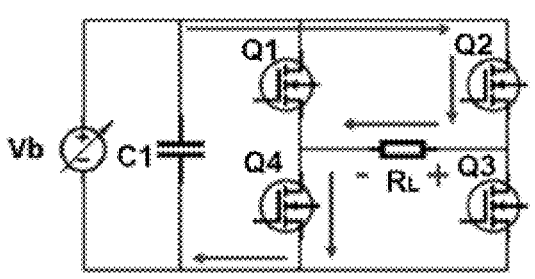 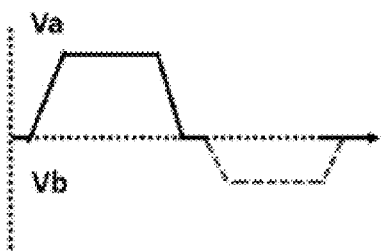
FIG. 1-C
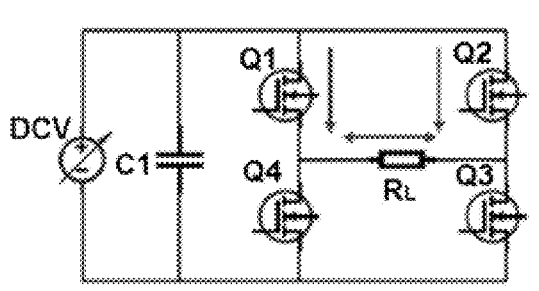 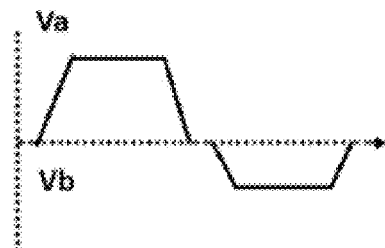

FIG. 5-A
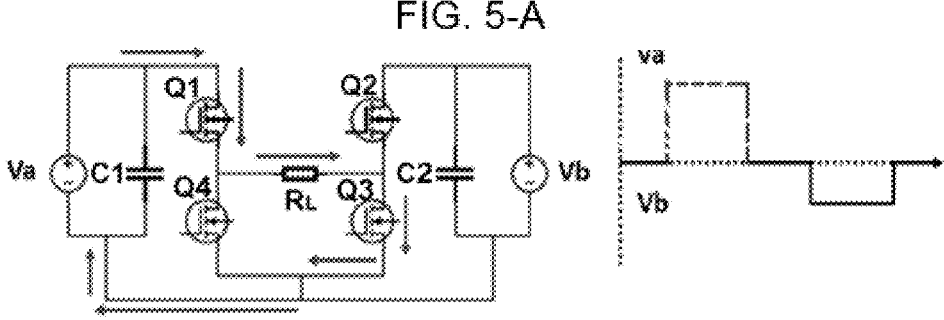
FIG. 5-B
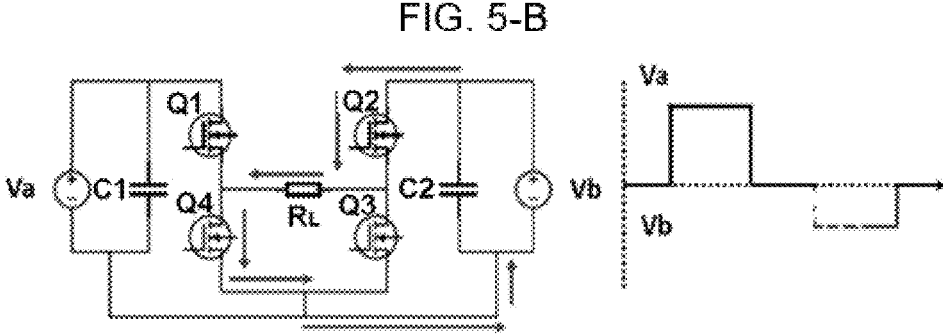
FIG. 5-C
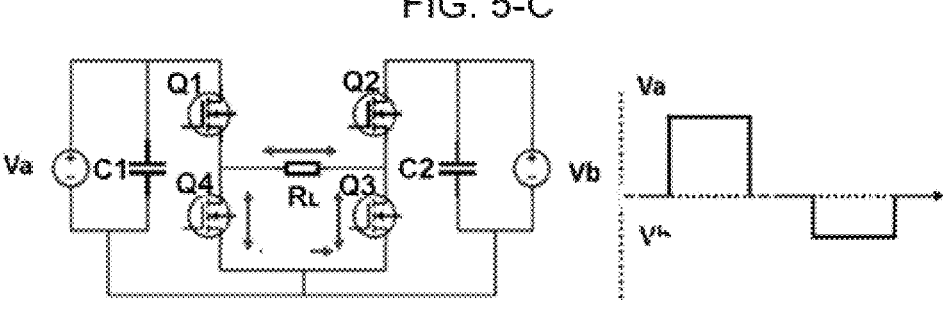

DIRECT CURRENT TO ASYMMETRICAL SQUARE WAVE ALTERNATING CURRENT CONVERTER

OBJECT OF THE INVENTION

The invention, as stated in the title of this specification, refers to a direct current to asymmetrical square wave alternating current converter contributing to the function to which it is designed with advantages and characteristics that are disclosed in detail thereafter and that means an improvement to the current state-of-the-art.

The object of this invention refers to a device converting direct current into alternating current (normally known in the sector by the respective acronyms in Spanish CC and CA or in English DC and AC) with asymmetrical square wave that, essentially designed for its use withing the industrial field of electric treatment of metallic surfaces, is distinguished in that it is capable to commutating at high frequency thanks to the particular configuration of the elements it comprises.

FIELD OF APPLICATION OF THE INVENTION

The field of application of this invention is within the sector of the industry engaged in the manufacture of electric apparatuses and devices to regulate voltages and currents, encompassing in particular the field of the D.C./A.C. converter designed to an industrial use in which regulated electric currents are required, namely in the sectors using electric currents to produce modifications on metallic surfaces, such as electroerosion, anodizing, galvanizing, especially relevant in the sector of electropolishing, as well in liquid as dry, although it does not limit that other sectors can take profit of this invention, such as the sector of digital electronics, as well as analog electronics or computer science, inter alias.

BACKGROUND OF THE INVENTION

The electric treatments of metallic surfaces, such as electroerosion, anodizing, galvanizing, electropolishing in liquid and electropolishing in solid, the plasma treatments, etc. have in common that they are based in applying some type of electric current on the surface to be treated. In most cases, the quality of the results directly depends on the control and regulation that exists on the current applied.

To produce suitable polish effects, the inversion of polarity can be used. Applying a positive voltage oxidizes the surface, generating metal oxides and the negative voltage assists to remove the oxides generated. As the chemical effect on the surface is different, both voltages have different optimal values. Therefore, the asymmetrical voltages are necessary.

The commutation between the positive and the negative voltage at high frequency improves the finishes obtained. Thus, the oxide layer formed, that is mostly not conductive, is thinner, which avoids electric locks while it increases the selectivity of the process in roughness peaks, improving the efficiency of the polish processes. Therefore, high frequencies of commutation are necessary.

In addition, as the electropolishing processes scale at industrial level, higher voltages or intensities are required. Therefore, strong systems are required that are capable of working with high voltages.

Thus, in the sector of metallic surface treatment, there exists a need, that up to now is not seen as completely overcome, of systems that simultaneously provide:

a. positive and negative asymmetrical voltages
b. at high frequency of commutation, and
c. capable of handling high voltages.

In general, and not focused in the sector of the treatments of surface, the increase of the commutation frequency is also essential for many other industrial applications, due to the fact it helps the compaction and reduction of passive elements, coil or inductance type and condensers, increasing the global performance.

Currently, a solution to obtain asymmetrical voltage pulses in amplitude, the Full-bridge topology is used, of four switch devices, or H-Bridge topology (FIGS. 1-A, 1-B, 1-C). To generate these pulses in an asymmetrical manner at different voltages, the Full-bridge requires that the DC bus is capable to provide two different voltages at a frequency higher than the commutation. Therefore, the DC power supply that delivers the power to the DC-bus should have to be provided with a dynamics of control or regulation of the output DC voltage of around microseconds for frequencies higher than 50 kHz.

In addition, the DC-bus requires a condenser to stabilize the voltage. It has as setoff that it acts as a filter that softens the quick changes of voltage that the DC power supply with high performances and quick regulation dynamics could carry out.

Therefore, with a Full-bridge classic topology, limitations exists to produce asymmetrical voltage pulses in frequencies of commutation higher than around the kHz.

Other possible apparent solutions would consist of using two DC-buses in parallel. However, in the practice, the fact that it has two power supplies of different voltage in parallel available, makes this alternative unviable because a short-circuit would occur between the two supplies.

The objective of this invention therefore is to overcome the problem described, by developing a DC to asymmetrical square wave AC current converter, capable to commute at high frequency.

On the other hand, and as reference to the current state-of-the-art, it shall be pointed out that, at least the applicant is not aware of the existence of any other device that presents technical and structural characteristics same or similar to those the herein claimed possess.

EXPLANATION OF THE INVENTION

The direct current to asymmetrical square wave alternating current converter that the invention proposes is configured as the suitable solution to the above-mentioned objective, the characterizing details making it possible and that duly distinguish it appearing in the final claims attached to this description.

Concretely, what the invention proposes, as it was said before, is a direct current to asymmetrical square wave alternating current converter capable to commute at high frequency, for which it basically comprises:

a. two direct current power supplies that provide, respectively, both output voltages, and-four commuting devices,
so that they form a bridge structure comprised of, at least, two half-bridge substructures, each of which includes two commuting devices and at least a direct current power supply, the said Half-bridge substructures being connected to each other in the intermediate and low branches, where the work charge is connected in the intermediate branch of the commuters.

With this, the converter, preferably, is capable of providing, to the work charge in the intermediate branch, three different states:

a. One with two of the commuters closed, that provide the charge with voltage supplied by a first power supply, b. another with the two other commuters closed, that provide the charge with the voltage supplied by the other power supply, and c. another with two other commuters closed, that does provide the charge with voltage, leaving the system uncharged.

In addition, the converter is capable of commuting between the three states at high frequency.

Preferably, the commuting systems are SiC MOSFET commuters.

Preferably, each Half-bridge substructure includes a condenser in parallel to the power supply.

Preferably, the duration of each step is regulated independently.

Preferably, the two direct current power supplies are regulable at their value of output voltage.

With all this, the advantages that the converter provides the invention with are multiple.

In the current state-of-the-art, to generate asymmetrical pulses at different voltages with a commutation high frequency Full-bridge, it is required that the DC-bus has a high commutation frequency. This requires power supplies having very high performances and high regulation dynamics with a high cost.

In the converter of the invention, the high frequency is determined by the frequency at which the commuters can act, therefore this converter contributes, in a novel manner, the capacity of generating pulses of asymmetrical voltage in amplitude at high commutation frequencies (>100 kHz) using standard CC power supplies, without requiring high dynamics of regulation.

This new system object of the invention can be controlled and modulated by adjusting a modulator used for the conventional H-Bridge, using a suitable coding. This implies that in the implementation of this new topography, elements available in the commerce can be used, which facilitates its application at industrial level.

DESCRIPTION OF THE DRAWINGS

To complement the description being carried out and in order to assist to best understand the characteristics of the invention, attached to this specification, as an integral part thereof, there is a set of drawings in which, for illustration and no limitation purpose, the following has been represented:

The FIGS. 1-A, 1-B and 1-C.—They show respective schemes of the states of a Full-bridge or H-Bridge topology together with the diagram of the voltage that occurs in each step, as sample of the already known;

Figure 2:
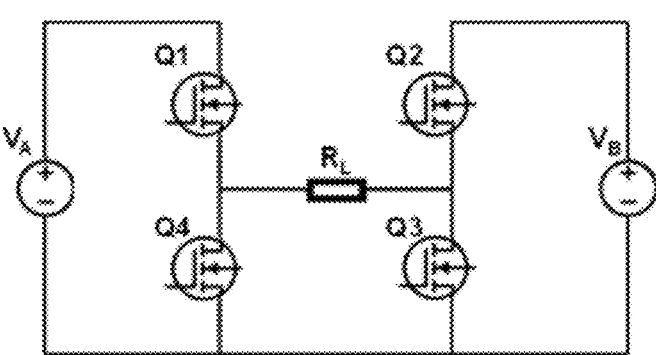
Figure 3:
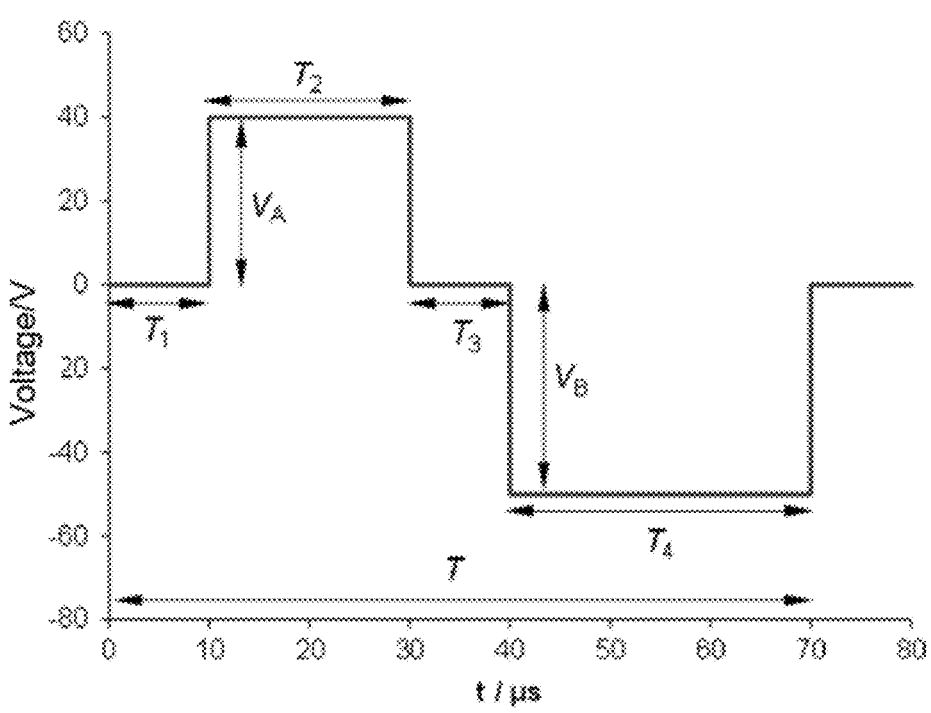
Figure 4:
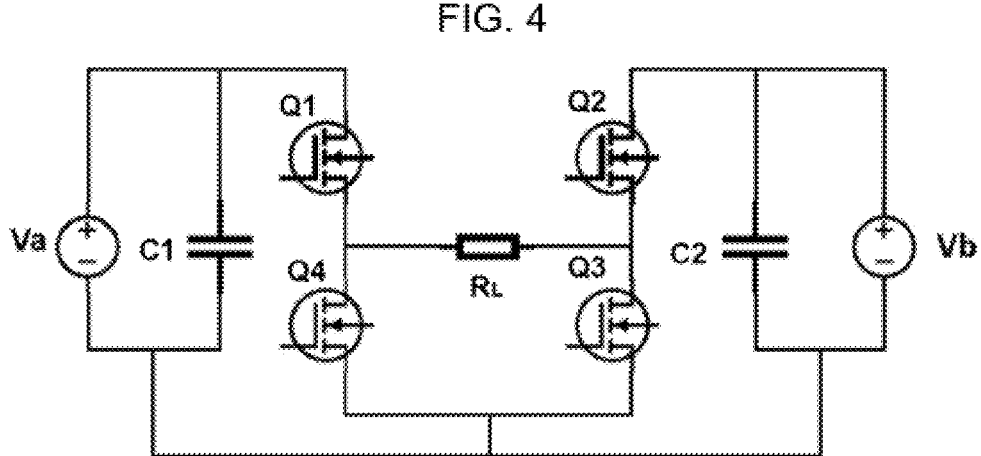

The FIG. 2.—It is a scheme of an example of a topology of the converter object of the invention;

The FIG. 3.—It is a diagram of the square wave obtained with the converter of the invention;

The FIG. 4.—It is a scheme of an example of a topology of the converter object of the invention;

The FIGS. 5-A, 5-B and 5-C.—They show respective examples of schemes of the states of a topology of the converter of the invention, together with the voltage of asymmetrical square wave that is produced by each of them.

4

Figure 6:
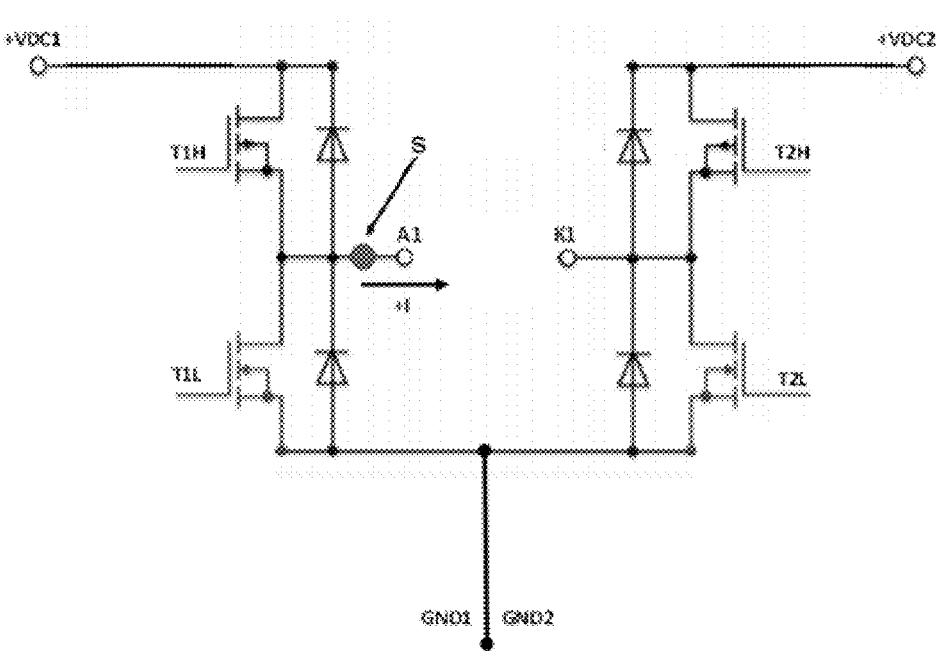
Figure 7:
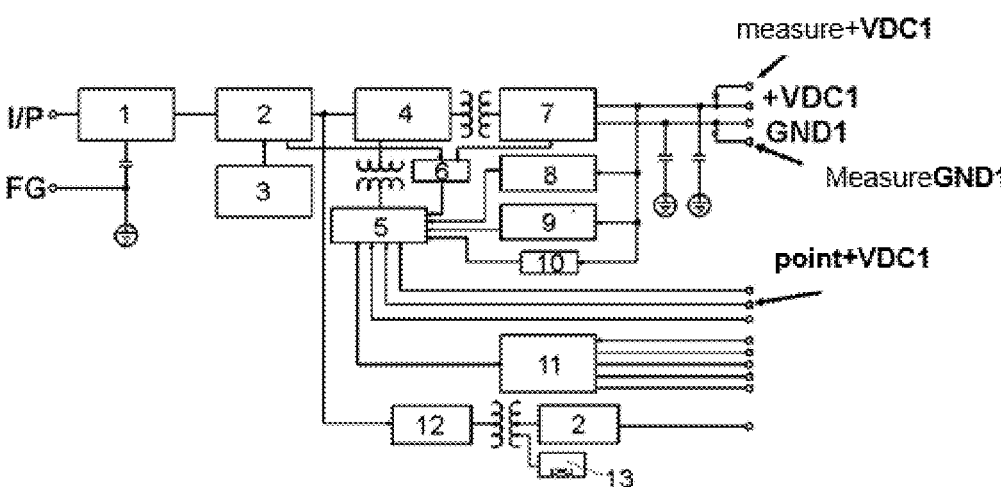
Figure 8:
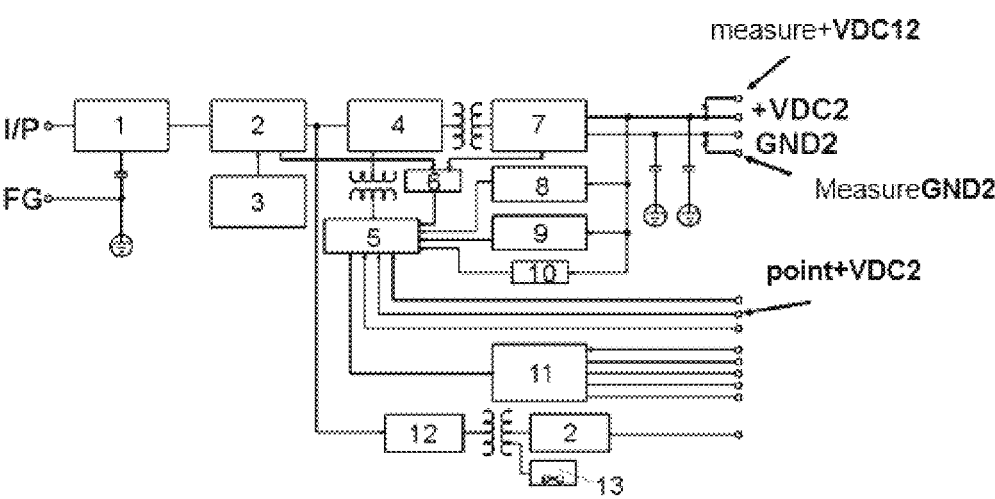
Figure 9:
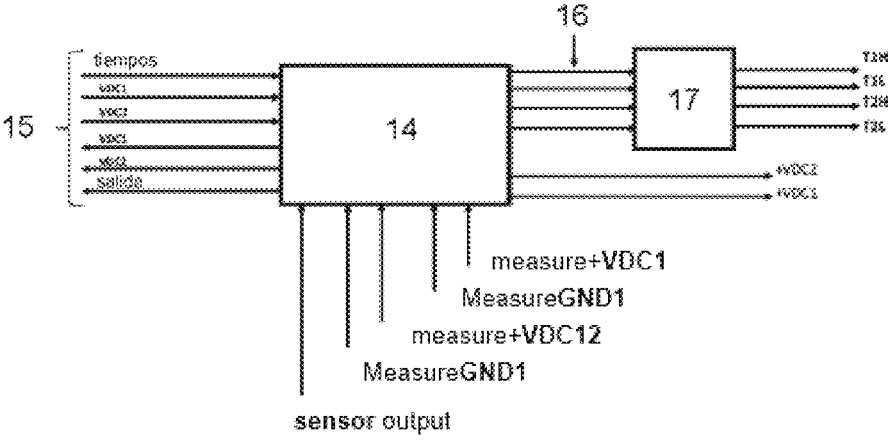

The FIG. 6.—It shows a scheme of the converter of the invention, in which four N-Channel SiC MOSFET semiconductors with their free circulation parasitic diodes;

The FIG. 7.—It shows an operational scheme of the controlled AC/DC power supply that supplies the VDC1 voltage;

The FIG. 8.—It shows an operational scheme of the controlled AC/DC power supply that supplies the VDC2 voltage;

The FIG. 9.—It shows a blocks diagram of the control unit of the power pulsers.

PREFERRED EMBODIMENT OF THE INVENTION

Seen the said figures, and according to the numerals adopted, it can be seen how the DC to asymmetrical square wave AC converter, capable of commuting at high frequency, object of the of the invention comprises at least:

a. Two direct current supplies A and B, that provide, respectively, $V_A$ and $V_B$ output voltages b. Four commuting devices (Q1, Q2, Q3 and Q4)

The novelty of this invention is the configuration in which these elements are arranged. This converter includes a bridge structure formed by two Half-bridge substructures, each of which includes two commuting devices and a direct current power supply. The Half-bridge substructures are connected in intermediate and low branches, the high branch remaining unconnected. The work charge is connected between the intermediate branches of the Half-bridge substructures.

The first Half-bridge substructure includes the direct current power supply A and the commuters Q1 and Q4. The second Half-bridge substructure includes the direct current power supply B and the commuters Q2 and Q3.

To facilitate understanding this invention, thereafter some definitions on the object of the invention are detailed.

Thus, is understood as asymmetrical square wave the one that, as it can be seen in the FIG. 3, can be described in an ideal manner by means of a period T subdivided into a first step of $T_1$ duration, at a zero voltage, a second step of $T_2$ duration at a $V_A$ voltage, a third step of $T_3$ duration at a zero voltage and a fourth final step of $T_4$ duration at a $V_B$ voltage. The $V_A$ and $V_B$ values are usually different, although they can also be equal. The duration of each step also can be different. The duration of some or several of the steps can be zero. An example of a representation of rectangular wave with the parameters that define it can be seen schematized in the FIG. 3.

In this text, is understood as high frequency the one that in which the period or the duration of at least some of its steps is less than 1 ms, or that its frequency is around the kHz or higher.

The topology of the converter of the invention can include a condenser in parallel to each direct current power supply that stabilizes the output voltage.

This topology allows the connection of two direct current power supplies of asymmetrical voltage in parallel at each of the Half-bridge substructures. The fact of having the high part of the DC-bus of a classic full-bridge structure not available allows to work with two different voltages without, in the practice, a short-circuit of the two different voltages of the power supply occur. To do it, this structure has to be controlled or modulated by means of three unique states, as it can be seen in the FIGS. 5-A, 5.B and 5-C.

This topology allows to operate in three unique states that provide voltages different to $R_L$;

a. One with two of the closed commuters Q1-Q3, that provides to the $R_L$ charge the $+V_A$ voltage (FIG. 5-A).

b. One with the two other closed commuters Q2-Q4 that provides to the $R_L$ charge the $-V_B$ voltage (FIG. 5-B).

c. And one with the other two closed commuters Q3-Q4, that does not provide voltage to the charge $R_L$ leaving the system uncharged (FIG. 5-C).

In the three figures, the voltage in the square wave has been represented, together with the scheme of each step, by means of a dashed line.

With respect to the four states of a Full-bridge topology, that topology operates three states equivalent to the said topology. To protect from a possible short-circuit of the two direct current power supplies through the charge, the fourth state is avoided (Q1-Q2 closed).

This topology of the converter of the invention allows the use of two direct current buses in parallel through the converter without the risk of short-circuit of the asymmetrical direct current supplies.

The DC power supplies or the direct current power supplies provide the voltage to the system.

Preferably, the DC supplies allow to regulate the voltage of the output direct current so that the converter can be adapted to different voltages required.

An advantage of this invention is that the DC supplies are not required to be dynamic high performances power supplies because the commutation frequency is determined by the commuters not by the supply.

On their side, the commuting devices shut or open the electrical circuit depending on an input. The commuting frequency of the device of this invention is determined by the commutation frequency of the commuting devices.

Preferably, MOSFET (Metal oxide semiconductor field-effect-transistor) or IGFET (insulated-gate field effect transistor) transistors are used, because they possess a long life and a high commutation speed. Within those transistors, the SiC MOSFET are preferably used, as they reduces the queue during the commutation, which reduces the commutation time and improves the stability. They also show less resistance in ON state and lower capacitance.

On the other side, in applications that require very stable voltages, the use of condensers is contemplated. The said condensers are located in each Half-bridge substructure in parallel to the direct current power supply.

The condensers in parallel to a direct current power supply receive the name of direct current BUS or DC BUS, the function of which is to filter and regulate the value of voltage that the power supply to which they are connected generates. If the electric current generated by the power supplies presents noise, the condensers filter it. On the other hand, the said condensers also act as buffer or current lung, in power supplies that have a small output condenser, they cannot supply great consumptions of current in little time (low dynamics) and transitory current peaks could not be produced for lack of speed. In these cases, the condensers in parallel to the exit act as lung, they can provide those peaks of current if the charge requires much current in little time, releasing the DC power supply.

For applications that require high speed, the BUS condensers can be a problem because their capacity of response depends on their dynamics or constant of time. For example, with classic condensers it would be not possible to generate microsecond pulses.

As setoff to the signal stabilization, these condensers affect the commutation speed. When the condensers are present, the derivate of the voltage vs time decreases, that means, the wave applied requires a longer time to reach the final voltage at each new step.

This invention generates, as output current, asymmetrical square waves controllable in their parameters.

By means of a control module, as those used to control a Full-bridge, times are regulated in which the system is in the three states Q1-Q3, Q2-Q4 AND Q3-Q4.

Although it is not strictly necessary, the output voltages are predicated to be regulable by means of the use of DC power supplies of regulable voltage.

According to the FIG. 6, an example of scheme of the converter of the invention can be seen, in which four N-Channel SiC MOSFET semiconductors can be seen (T1H, T1L, T2H and T2L) with their free circulation parasitic diodes.

The topology shown presents two supplying points or two DC-links partly isolated. Between the point +VDC1 and the point GND1, the DC output of the AC/DC power supply is connected that will govern the voltage of the positive pulses or positive voltage. Between the points +VDC2 and the point GND2, the DC output of the AC/DC power supply will be connected that will govern the voltage of the negative pulses or negative voltage.

When they are in ON state, the semiconductors T1H and T2L (and therefore the semiconductors T2H and T1L are in OFF state), the voltage +VDC1 appears applied between the Outputs A1 and K1. This state will remain applied in the said semiconductors during the length of time consigned for the Positive pulse. In this state, the current flows toward the charge exiting by A1 and entering by K1, after crossing the charge.

When they are in ON state, the semiconductors T2H and T1L (and therefore the semiconductors T1H and T2L are in OFF state), the voltage +VDC2 appears applied between the Outputs K1 and A1. This state will remain applied in the said semiconductors during the length of time consigned for the Negative pulse. In this state, the current flows towards the charge exiting by K1 and entering by A1, after crossing the charge.

When it is sought to apply the times of null pulses or dead state, the semiconductors T1L and T2L are activated, setting a null voltage at the outputs A1 and K1 of the converter.

In the FIG. 6, it can be seen how the potentials GND1 and GND2 remain joined when connected to the ow point of the DC-Link of the converter of the invention.

In the said FIG. 6, likewise, the existence of a sensor (s) can be seen close to the output A1.

The FIG. 7 shows an operational scheme of the controlled AC/DC supply that supplies the VDC1 Voltage. This power supply is supplied by means of a RST+N+PE three-phase signal of 230 Vac (F—N) 50 Hz. The regulation of the output DC voltage value is carried out by means of a 0-6V signal of setpoint, the setpoint of 0V corresponding to 0V of output voltage and the 6V to the maximum output 60V. The measure of output voltage is directly taken from the voltage bars +VDC1/GND2 of power supply output.

On its side, the FIG. 8 shows the operational scheme of the controlled AC/DC power supply that supplies the VDC2 voltage. This power supply is supplied by means of three-phase signal RST+N+PE of 230 Vac (F—N) 50 Hz. The regulation of the output DC voltage value is carried out by means of a 0-6V signal of setpoint, corresponding to the 0V fixed value to 0V of output voltage and the 6V to the maximum output 60V. The measure of output voltage is directly taken from the voltage bars +VDC2/GND. of power supply output. In both FIGS. 7 and 8, the circuit essentially comprises the following conventional elements:

EMI filter (1),
rectifiers and PFC (2)
PFC control (3)
energy commutator (4)
control circuit (5)
O.T.P. (6)
rectifiers and filters (7)
detection circuit (8)
present limit (9)
O.V.P. (10)
insulator and relay (11)
auxiliar power (12)
fan (13)

Finally, according to the FIG. 9, a blocks scheme of the control unit (14) of the power pulsers can be seen. The control unit communicates with the control PLC by means of an industrial bus (15) with MODBUS TCP protocol. By means of this protocol, the control PLC sends to the Power control unit the orders of positive voltage (+VDC1) and negative voltage (+VDC2). Also, the value wanted of the four pulsing times is sent. From the voltage order, as well positive as negative, the control system generates a voltage signal 0V-6V for each of the two AC/DC power supplies, ordering thus the DC value wanted in each of them.

On the other hand, the control system, from the orders of pulse times, generates a modulation for each of the SIC Mosfet semiconductors of the converter of the invention. These four signals are sent by means of optical fiber (16) to avoid interferences and synchrony delays between them. The optical signals reach the door drivers (17) that are in charge of transforming the optical signals into electric signals of the format +20V/−3V, optimum for a SIC semiconductor door triggering.

The system of power control also is in charge of collect the measures of voltage of each DC power supply, as well as the measure of output current. After having filtered and formatted this information, the measures are sent to the control PLC by means of the MODBUS TCP protocol bus.

Sufficiently disclosed the nature of this invention, as well as the manner of implementing it, it is not deemed necessary to extend anymore its explanation in order that any person skilled in the art understands its extends and the advantages arising from it.

The invention claimed is:

1. A direct current to asymmetrical square wave alternating current converter comprising:
 two direct current supplies A and B, that provide, respectively, $V_A$ and $V_B$ output voltages; and;
 four commuting devices (Q1, Q2, Q3 and Q4), the two direct current supplies A and B and the four commuting devices form a bridge structure comprising at least two Half-bridge substructures, each of which includes two of the commuting devices and at least one of the direct current power supplies A and B, the Half-bridge substructures being connected to each other in intermediate and low branches and configured to produce a work charge $R_L$ in the intermediate branch,
 in a first state of the bridge structure, a first two (Q1 and Q3) of the commuting devices are closed to produce the work charge with voltage supplied by direct current supply A, in a second state of the bridge structure, a second two (Q1 and Q4) of the commuting devices are closed to produce the work charge with voltage supplied by direct power supply B,
 in a third state of the bridge structure, a third two (Q3 and Q4) of the commuting devices are closed with no work charge being produced.

2. The direct current to asymmetrical square wave alternating current converter according to claim 1 being configured to commute between three high frequency states.

3. The direct current to asymmetrical square wave alternating current converter according to claim 1, wherein the commuting devices (Q1, Q2, Q3 and Q4) are silicon carbide MOSFET commutators.

4. The direct current to asymmetrical square wave alternating current converter according to claim 1, further comprising a first condenser arranged in parallel to the direct current supply A, and a second condenser arranged in parallel to the direct current supply B.

5. The direct current to asymmetrical square wave alternating current converter according to claim 1 being configured to produce an asymmetrical square wave in different steps, the duration of each step being regulated independently.

6. The direct current to asymmetrical square wave alternating current converter according to claim 1, wherein the direct current supplies A and B are respectively regulable to output voltage value $V_A$ and $V_B$.

7. The direct current to asymmetrical square wave alternating current converter according to claim 1, wherein the commuting devices (Q1, Q2, Q3 and Q4) are silicon carbide MOSFET commutators.

8. The direct current to asymmetrical square wave alternating current converter according to claim 3, wherein the commuting devices (Q1, Q2, Q3 and Q4) are silicon carbide MOSFET commutators.

9. The direct current to asymmetrical square wave alternating current converter according to claim 2, further comprising a first condenser arranged in parallel to the direct current supply A, and a second condenser arranged in parallel to the direct current supply B.

10. The direct current to asymmetrical square wave alternating current converter according to claim 3, further comprising a first condenser arranged in parallel to the direct current supply A, and a second condenser arranged in parallel to the direct current supply B.

11. The direct current to asymmetrical square wave alternating current converter according to claim 2, wherein the direct current supplies A and B are respectively regulable to output voltage value $V_A$ and $V_B$.

12. The direct current to asymmetrical square wave alternating current converter according to claim 3, wherein the direct current supplies A and B are respectively regulable to output voltage value $V_A$ and $V_B$.

13. The direct current to asymmetrical square wave alternating current converter according to claim 4, wherein the direct current supplies A and B are respectively regulable to output voltage value $V_A$ and $V_B$.

14. The direct current to asymmetrical square wave alternating current converter according to claim 5, wherein the direct current supplies A and B are respectively regulable to output voltage value $V_A$ and $V_B$.

* * * * *